(12) United States Patent
Neu

(10) Patent No.: US 12,310,387 B2
(45) Date of Patent: May 27, 2025

(54) SWEETENER COMPOSITIONS

(71) Applicant: NeuEnterprises LLC, Park City, UT (US)

(72) Inventor: James C. Neu, Park City, UT (US)

(*) Notice: Subject to any disclaimer, the term of this patent is extended or adjusted under 35 U.S.C. 154(b) by 0 days.

(21) Appl. No.: 18/598,405

(22) Filed: Mar. 7, 2024

(65) Prior Publication Data
US 2024/0298684 A1 Sep. 12, 2024

Related U.S. Application Data

(60) Provisional application No. 63/450,893, filed on Mar. 8, 2023.

(51) Int. Cl.
*A23L 27/30* (2016.01)
*A23L 27/12* (2016.01)
*A23L 29/30* (2016.01)

(52) U.S. Cl.
CPC .............. *A23L 27/33* (2016.08); *A23L 27/12* (2016.08); *A23L 29/30* (2016.08)

(58) Field of Classification Search
CPC ........... A23L 27/33; A23L 29/30; A23L 27/12
USPC ....................................... 426/548
See application file for complete search history.

(56) References Cited

U.S. PATENT DOCUMENTS

| 11,134,709 | B2 | 10/2021 | Hofmekler | |
| 2016/0143333 | A1* | 5/2016 | Cox | A21D 2/36 |
| | | | | 426/548 |
| 2016/0235098 | A1* | 8/2016 | Cox | A23G 3/38 |

FOREIGN PATENT DOCUMENTS

| WO | WO-2020/123067 | 6/2020 |
| WO | WO-2021/232750 | 11/2021 |

OTHER PUBLICATIONS

International Search Report and Written Opinion dated May 30, 2024 for PCT/US2024/018910.

* cited by examiner

Primary Examiner — Subbalakshmi Prakash
(74) Attorney, Agent, or Firm — Foley & Lardner LLP

(57) ABSTRACT

This disclosure relates to sugar-free sweetener compositions that have substantially the same taste, mouth feel and texture as simple syrup and leave a minimal or negligible aftertaste. The disclosure further relates to methods for making the sugar-free sweetener compositions of the present disclosure and methods for sweetening a beverage or food product using the sugar-free sweetener compositions of the present disclosure.

19 Claims, 1 Drawing Sheet

| Nutrient | Label Value per 100g (approx 67 servings) | per 1.5g serving |
|---|---|---|
| Total Calories | 146 | 0 |
| Calories from Fat | 0 | 0 |
| Calories from Saturated Fat | 0 | 0 |
| Total Fat | 0 | 0 |
| Satrated Fat | 0 | 0 |
| Trans Fat | 0 | 0 |
| Polyunsaturated Fat | 0 | 0 |
| Monunsaturated Fat | 0 | 0 |
| Cholesterol | 0 | 0 |
| Sodium | 0 | 0 |
| Potassium | 0 | 0 |
| Total Carbohydrate | 95 | 1 |
| Dietary Fiber | 87 | 1 |
| Soluble Fiber | 87 | 1 |
| Insoluble Fiber | 0 | 0 |
| Sugars | 2 | 0 |
| Sugar Alcohol | 0 | 0 |
| Other Carbohydrate | 0 | 0 |
| Protein | 0 | 0 |
| Calcium | 0 | 0 |
| Iron | 0 | 0 |
| Water | 0 | 0 |

| Nutrient | Label Value per 100g (approx 67 servings) | per 1.5g serving |
|---|---|---|
| Total Calories | 146 | 0 |
| Calories from Fat | 0 | 0 |
| Calories from Saturated Fat | 0 | 0 |
| Total Fat | 0 | 0 |
| Satrated Fat | 0 | 0 |
| Trans Fat | 0 | 0 |
| Polyunsaturated Fat | 0 | 0 |
| Monunsaturated Fat | 0 | 0 |
| Cholesterol | 0 | 0 |
| Sodium | 0 | 0 |
| Potassium | 0 | 0 |
| Total Carbohydrate | 95 | 1 |
| Dietary Fiber | 87 | 1 |
| Soluble Fiber | 87 | 1 |
| Insoluble Fiber | 0 | 0 |
| Sugars | 2 | 0 |
| Sugar Alcohol | 0 | 0 |
| Other Carbohydrate | 0 | 0 |
| Protein | 0 | 0 |
| Calcium | 0 | 0 |
| Iron | 0 | 0 |
| Water | 0 | 0 |

SWEETENER COMPOSITIONS

CROSS-REFERENCE TO RELATED PATENT APPLICATION

This application claims the benefit under 35 U.S.C. § 119 (e) of U.S. Provisional Application No. 63/450,893, filed Mar. 8, 2023, the entire contents of which are incorporated herein by reference.

BACKGROUND

Carbohydrate sweeteners (e.g., sucrose, fructose) have traditionally been used to sweeten foods and beverages. While the taste of carbohydrate sweeteners is familiar and desirable to many consumers, the caloric content of carbohydrate sweeteners is less desirable. Increasingly health-conscious consumers have generated demand for low or no-calorie alternatives to carbohydrate sugars, including saccharin, aspartame, acesulfame-K, cyclamate, neotame and sucralose.

Recently, sweeteners such as Stevia and Luo Han Guo have garnered much attention as both non-caloric and natural. Stevia sweeteners are derived (e.g., extracted) from *Stevia rebaudiana* (Bertoni), a perennial shrub of the Asteracae (Compositae) family native to Brazil and Paraguay. The major constituents in the leaves of *S. rebaudiana* are diterpenoid glycosides of the steviol ent-13-hydroxykaur-16-en-19-oic acid. While some steviol glycosides are sweet (about 300 times sweeter than sucrose sugar), others have intense bitter characteristics, licorice tastes and prolonged aftertastes. Stevioside and rebaudioside A are some of the sweetest and most abundant steviol glycosides that can be obtained from the Stevia plant.

Although rebaudioside A and stevioside are known to be among the sweetest steviol glycosides, these compounds actually exhibit unpleasant off-notes (e.g., bitter tastes, licorice tastes, sweetness linger and strong aftertastes) when used in the concentrations necessary to obtain 10% sucrose equivalence, a common metric used to measure the flavor and temporal profile of a sweetener.

Monk fruit (Luo Han Guo, sometimes spelled as Lo Han Guo or Lo Han Kuo), is the common name for the Chinese fruit *Momordica grosvenorii* (Swingle), also called Siraitia grosvenorii, belonging to the Cucurbitaceae family. Siraitia grosvenorii is an herbaceous perennial vine native to southern China, and its Luo Han Guo fruit is well known for its sweet taste. The fruit extract is around 150-300 times sweeter than sugar, and has been used as a natural sweetener in China for nearly a millennium. However, Lo Han Guo has a slower sweetness onset compared to sucrose and a strong sweet lingering aftertaste.

In addition to a lingering aftertaste, typical high-intensity sweeteners, including *stevia* and monk fruit combinations, have other disadvantages. As the typical high-intensity sweeteners are much stronger in sweetness than regular sugars, they are used at much lower concentrations. Therefore, compositions (e.g., simple syrups) made with typical high-intensity sweeteners do not have the taste profile or the body (physical characteristics such as viscosity, mouth feel or texture) to truly mimic the attributes of sugar, especially when mixed into a beverage. Ingredients such as allulose can mimic the body and some of the sweetness, but those ingredients do not have the same taste profile as sugar, and have to be labeled as carbohydrates. Sugar alcohols such as erythritol or xylitol can taste similar to sugar, but do not have the same mouthfeel and may cause digestive issues due to their non-absorption in the digestive tract. Some sugar alcohols are also poisonous to most non-primate animals, including household pets.

Accordingly, there is a need for new and improved sweetener compositions with improved sugar-like taste and quality (e.g., viscosity, mouth feel and texture) and without the unpleasant after-taste.

SUMMARY OF THE DISCLOSURE

Disclosed herein are sugar-free sweetener compositions designed for use in food products and beverages. The sweetener compositions of the instant disclosure taste like premium cane sugar and mix well with strong citrus and berry flavors. The compositions of the instant disclosure are designed specifically to replicate the taste, body and mouthfeel of sugar, and therefore when mixed into a liquid the taste, body and mouthfeel of a simple syrup, without the calories or carbohydrates.

An aspect of the disclosure is directed to a composition comprising, or consisting essentially of, or consisting of, by weight of the total composition: 0.0001-40% stevia leaf extract, 0.0001-40% Monk fruit (Luo Han Guo) extract, 0.0001-10% at least one flavor, and 50-99.9% dietary fiber, wherein the composition has an approximate viscosity of between about 1000 and about 10000 centipoise at 20° C., optionally between about 2000 and about 5000 centipoise at 20° C.

An aspect of the disclosure is directed to a composition comprising, or consisting essentially of, or consisting of, by weight of the total composition: 0.0001-40% stevia leaf extract, 0.0001-20% Monk fruit (Luo Han Guo) extract, 0.0001-10% at least one flavor, and 50-99.9% dietary fiber, wherein the composition has an approximate viscosity of between about 1000 and about 10000 centipoise at 20° C., optionally between about 2000 and about 5000 centipoise at 20° C.

Another aspect of the disclosure is directed to a sweetener composition comprising, or consisting essentially of, or consisting of, by weight of the total composition: 0.5-55% of stevia leaf extract, 0.1-5% of Monk fruit (Luo Han Guo) extract, 0.1-5% of at least one flavor, and 0.0001-10% masking agent.

Another aspect of the disclosure is directed to a sweetener composition comprising, or consisting essentially of, or consisting of, by weight of the total composition: 0.5-55% of stevia leaf extract, 0.1-5% of Monk fruit (Luo Han Guo) extract, 0.1-5% of at least one flavor, and 0.0001-5% masking agent.

Another aspect of the disclosure is directed to a sweetener composition comprising, or consisting essentially of, or consisting of, by weight of the total composition: 0.5-55% of stevia leaf extract, 0.1-5% of Monk fruit (Luo Han Guo) extract, 0.1-5% of at least one flavor, and 0.0001-1% masking agent.

Another aspect of the disclosure is directed to a sweetener composition comprising, or consisting essentially of, or consisting of, by weight of the total composition: 0.5-60% of stevia leaf extract, 0.1-20% of at least one flavor, and 0.0001-10% masking agent.

Another aspect of the disclosure is directed to a sweetener composition comprising, or consisting essentially of, or consisting of, by weight of the total composition: 0.5-60% of Monk fruit (Luo Han Guo) extract, 0.1-20% of at least one flavor, and 0.0001-10% masking agent.

In some embodiments, the steviol glycoside comprises one or more steviol glycoside selected from Stevioside, Dulcoside A, Rebaudioside A, Rebaudioside B, Rebaudioside C, Rebaudioside D, Rebaudioside E, Rebaudioside F, Rebaudioside M, Rubusoside, and Steviolbioside. In some embodiments, the steviol glycoside comprises or consists essentially of Rebaudioside M.

In some embodiments, the at least one flavor is a natural or artificial flavor selected from vanilla flavor, caramel flavor, bourbon flavor or molasses flavor; or an artificial flavor such as vanillin or ethylvanillin; or a natural or artificial flavor selected for its caramel or vanilla notes such as pecan, maple or rum flavor.

In some embodiments, the dietary fiber comprises a soluble dietary fiber.

In some embodiments, the soluble dietary fiber is selected from tapioca fiber, maltodextrin, corn fiber, oat fiber, pea fiber, bean fiber, apple fiber, citrus fruit fiber, carrot fiber, potato fiber, galacto-oligosaccharide or psyllium fiber.

In some embodiments, the combined amount of the stevia leaf extract and the steviol glycoside is less than 2%, or alternatively less than 1% or alternatively less than 0.5% of the total weight of the composition.

In some embodiments, the viscosity of the composition is approximately identical to the viscosity of a simple syrup made up of 1:1 (1 part: 1 part) sugar:water. In some embodiments, the viscosity of the composition is at least 50%, at least 60%, at least 70%, at least 80%, at least 90%, at least 95% or at least 99% of the viscosity of a simple syrup made up of made up of 1:1 sugar:water.

In some embodiments, the composition has substantially the same mouth feel and texture as simple syrup made up of 1:1 sugar:water.

In some embodiments, the composition further comprises 0.0001-20% masking agent.

In some embodiments, the composition further comprises 0.0001-20% sodium chloride (table salt). In some embodiments, sodium chloride is used as or in addition to a masking agent to reduce the bitterness of the composition.

In some embodiments, the composition is comprised of ingredients meeting USDA standards for organic ingredients, and can be labeled as 'USDA Organic' or 'USDA Organic-compliant'.

Another aspect of the disclosure is directed to a method of making a sweetener composition, comprising or consisting essentially of, or consisting of: admixing, by weight of the total composition: 0.0001-40% stevia leaf extract, 0.0001-40% Monk fruit (Luo Han Guo) extract, 0.0001-10% at least one flavor, and 50-99.9% dietary fiber by weight of the composition, wherein the composition has an approximate viscosity of between about 1000 and about 10000 centipoise at 20° C., optionally between about 2000 and about 5000 centipoise at 20° C. when mixed into a liquid at the appropriate concentration.

Another aspect of the disclosure is directed to a method of making a sweetener composition, comprising or consisting essentially of, or consisting of: admixing, by weight of the total composition: 0.0001-40% stevia leaf extract, 0.0001-20% Monk fruit (Luo Han Guo) extract, 0.0001-10% at least one flavor, and 50-99.9% dietary fiber, wherein the composition has an approximate viscosity of between about 1000 and about 10000 centipoise at 20° C., optionally between about 2000 and about 5000 centipoise at 20° C. when mixed into a liquid at the appropriate concentration.

Another aspect of the disclosure is directed to a method for sweetening a beverage or a food product comprising adding to the beverage or the food product the compositions of the instant disclosure or the composition produced by the methods of the instant disclosure.

BRIEF DESCRIPTION OF THE DRAWINGS

FIG. 1 provides a food nutrition label for an exemplary sweetener composition of the instant disclosure.

DETAILED DESCRIPTION

It is to be understood that this invention is not limited to particular embodiments described, as such may, of course, vary. It is also to be understood that the terminology used herein is for the purpose of describing particular embodiments only, and is not intended to be limiting, since the scope of this invention will be limited only by the appended claims.

The detailed description of the invention is divided into various sections only for the reader's convenience and disclosure found in any section may be combined with that in another section. Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications mentioned herein are incorporated by reference to disclose and describe the methods and/or materials in connection with which the publications are cited.

All numerical designations, e.g., pH, temperature, time, concentration, and molecular weight, including ranges, are approximations which are varied (+) or (−) by increments of 0.1 or 1.0, where appropriate. It is to be understood, although not always explicitly stated, that all numerical designations are preceded by the term "about." It also is to be understood, although not always explicitly stated, that the reagents described herein are merely exemplary and that equivalents of such are known in the art.

It must be noted that as used herein and in the appended claims, the singular forms "a", "an", and "the" include plural referents unless the context clearly dictates otherwise. Thus, for example, reference to "a cell" includes a plurality of cells.

As will be understood by one skilled in the art, for any and all purposes, all ranges disclosed herein also encompass any and all possible subranges and combinations of subranges thereof. Furthermore, as will be understood by one skilled in the art, a range includes each individual member.

Definitions

As it would be understood, the section or subsection headings as used herein is for organizational purposes only and are not to be construed as limiting and/or separating the subject matter described.

The following definitions assist in defining the meets and bounds of the inventions as described herein.

The term "about" when used before a numerical designation, e.g., temperature, time, amount, concentration, and such other, including a range, indicates approximations which may vary by (+) or (−) 10%, 5% or 1%.

"Comprising" or "comprises" is intended to mean that the compositions, for example media, and methods include the recited elements, but not excluding others. "Consisting essentially of" when used to define compositions and methods, shall mean excluding other elements of any essential significance to the combination for the stated purpose. Thus, a composition consisting essentially of the elements as defined herein would not exclude other materials or steps that do not materially affect the basic and novel characteristic(s) of the claimed invention. "Consisting of" shall mean excluding more than trace elements of other ingredients and substantial method steps. Embodiments defined by each of these transition terms are within the scope of this invention.

As used herein, comparative terms as used herein, such as high, low, increase, decrease, reduce, or any grammatical variation thereof, can refer to certain variation from the reference. In some embodiments, such variation can refer to about 10%, or about 20%, or about 30%, or about 40%, or about 50%, or about 60%, or about 70%, or about 80%, or about 90%, or about 1 fold, or about 2 folds, or about 3 folds, or about 4 folds, or about 5 folds, or about 6 folds, or about 7 folds, or about 8 folds, or about 9 folds, or about 10 folds, or about 20 folds, or about 30 folds, or about 40 folds, or about 50 folds, or about 60 folds, or about 70 folds, or about 80 folds, or about 90 folds, or about 100 folds or more higher than the reference. In some embodiments, such variation can refer to about 1%, or about 2%, or about 3%, or about 4%, or about 5%, or about 6%, or about 7%, or about 8%, or about 0%, or about 10%, or about 20%, or about 30%, or about 40%, or about 50%, or about 60%, or about 70%, or about 75%, or about 80%, or about 85%, or about 90%, or about 95%, or about 96%, or about 97%, or about 98%, or about 99% of the reference.

"Optional" or "optionally" means that the subsequently described circumstance may or may not occur, so that the description includes instances where the circumstance occurs and instances where it does not.

As used herein, "and/or" refers to and encompasses any and all possible combinations of one or more of the associated listed items, as well as the lack of combinations when interpreted in the alternative ("or").

"Substantially" or "essentially" means nearly totally or completely, for instance, 95% or greater of some given quantity. In some embodiments, "substantially" or "essentially" means 95%, 96%, 97%, 98%, 99%, 99.5%, or 99.9%.

As used herein, a "simple syrup" refers to a composition comprising from about 0.5-1 to about 1:1 sugar (a caloric sugar such as glucose, sucrose or fructose) and water (v:v). In some instances, a simple syrup is prepared by mixing the sugar with water until all the sugar is dissolved in the water. In some instances, heating the water may be required to improve solubility. After all the sugar has been dissolved, the simple syrup is cooled to room temperature (about 20° C., e.g., 18° C., 19° C., 20° C., 21° C., 22° C. or any value therebetween). A simple syrup has substantially no sugar precipitates (e.g., sugar crystals), and is optionally a homogenous solution. A simple syrup has an approximate viscosity of between about 1000 and about 10000 centipoise at 20° C., optionally between about 2000 and about 5000 centipoise at 20° C. A simple syrup has sweetness of about 25-60 Brix (e.g., about 25, 30, 35, 40, 45, 50, 55, 60, or 65 Brix).

As used herein, the term "sugar" refers to the group of sweet-tasting, water-soluble carbohydrates such as glucose, galactose, fructose, sucrose, maltose and lactose. As used herein, the term "sugar-free composition" refers to a composition without any sugar.

As used herein, the sweetness of a composition is measured as the equivalent sucrose sweetness as perceived by a human. For instance, if one gram of a sweetener composition produces the same level as that of 100 grams of sucrose, the sweetener composition is said to be 100 times sweeter than sucrose. In some embodiments, the sweetness of a composition is measured in Brix, which is percent sugar (sucrose) equivalent by weight. For instance, a 60 Brix composition has sweetness equivalent to the sweetness of a 100 g composition having 60 g sugar (sucrose) and 40 g water.

As used herein, a "steviol glycoside" refers to a glycoside of steviol:

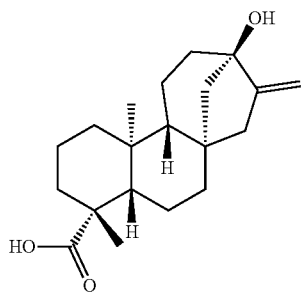

Examples of steviol glycosides include Stevioside, Dulcoside A, Rebaudioside A, Rebaudioside B, Rebaudioside C, Rebaudioside D, Rebaudioside E, Rebaudioside F, Rebaudioside M, Rubusoside, and Steviolbioside.

As used herein, "Stevioside" refers to a steviol glycoside having the chemical following formula:

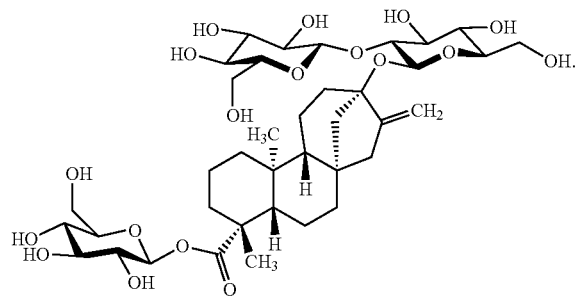

As used herein, "Dulcoside A" refers to a steviol glycoside having the chemical following formula:

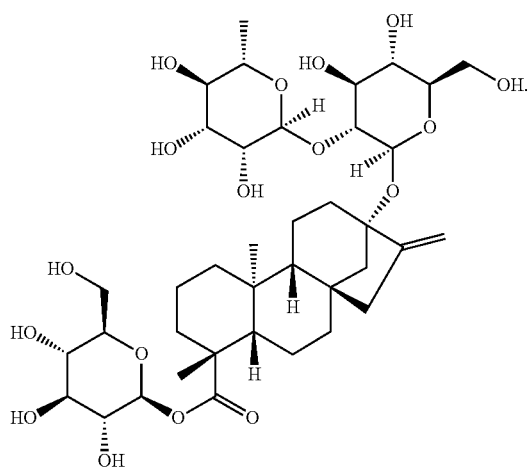

As used herein, "Rebaudioside A" refers to a steviol glycoside having the chemical following formula:

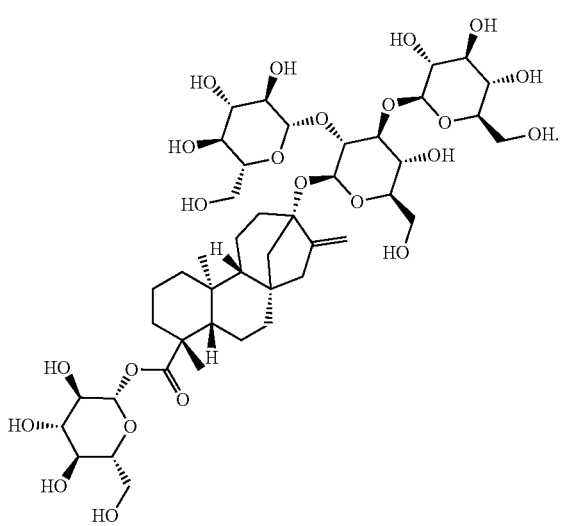 [SMILES: C=C1C[C@]2(C)C[C@@]1(O[C@@H]1O[C@H](CO)[C@@H](O)[C@H](O[C@@H]3O[C@H](CO)[C@@H](O)[C@H](O)[C@H]3O)[C@H]1O[C@@H]1O[C@H](CO)[C@@H](O)[C@H](O)[C@H]1O)CC[C@H]2[C@]1(C)CCC[C@@](C)(C(=O)O[C@@H]2O[C@H](CO)[C@@H](O)[C@H](O)[C@H]2O)[C@H]1CC]

As used herein, "Rebaudioside B" refers to a steviol glycoside having the chemical following formula:

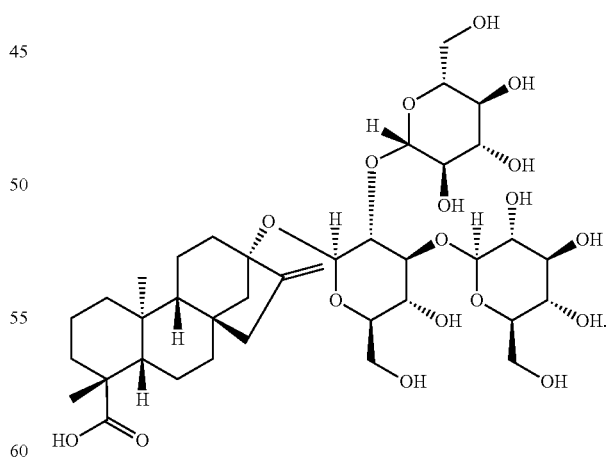

As used herein, "Rebaudioside C" refers to a steviol glycoside having the chemical following formula:

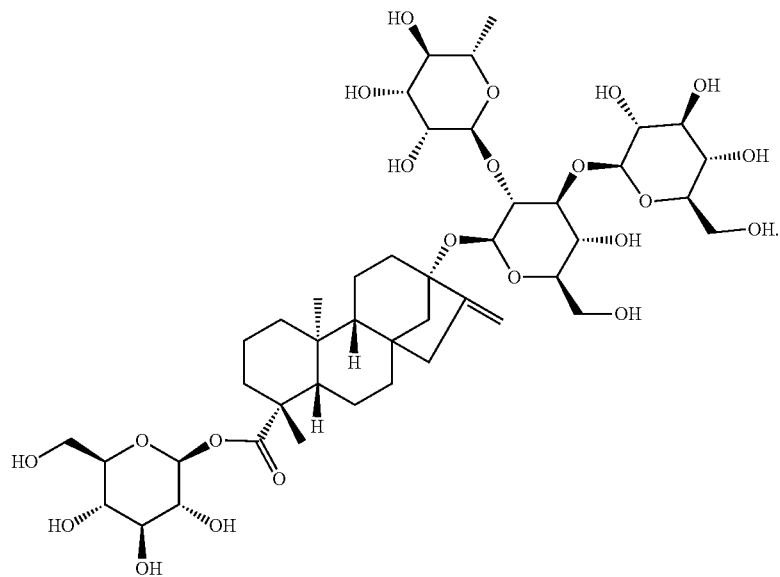
As used herein, "Rebaudioside D" refers to a steviol glycoside having the chemical following formula:
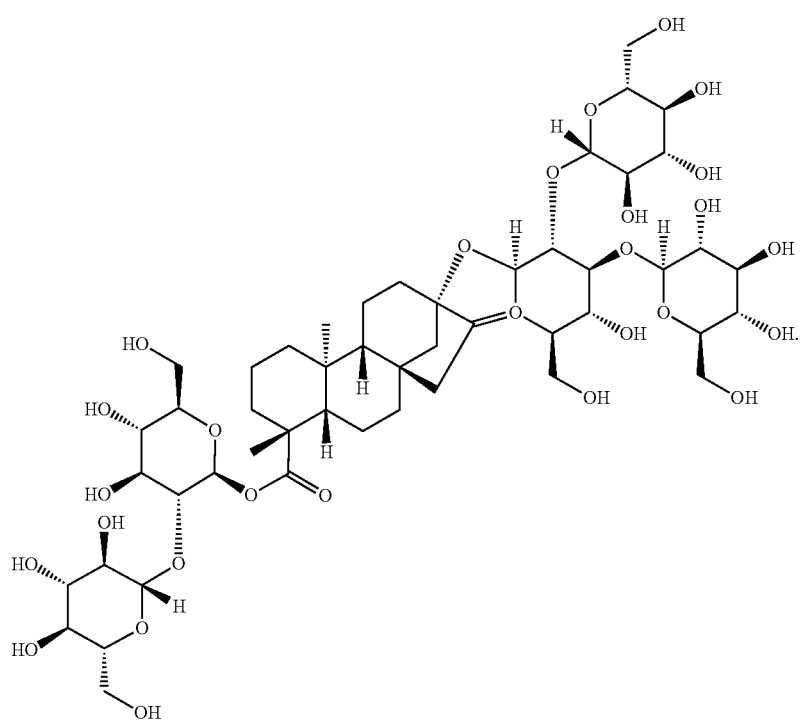
As used herein, "Rebaudioside E" refers to a steviol glycoside having the chemical following formula:

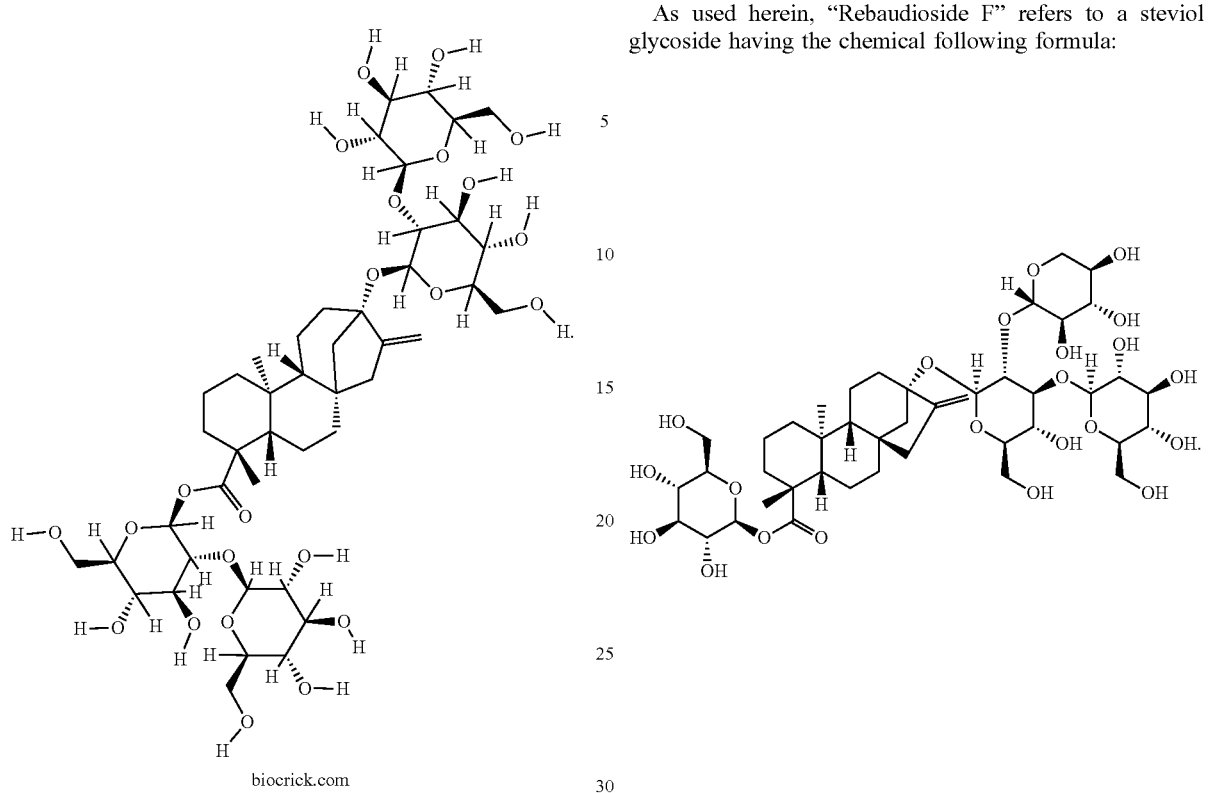
As used herein, "Rebaudioside F" refers to a steviol glycoside having the chemical following formula:
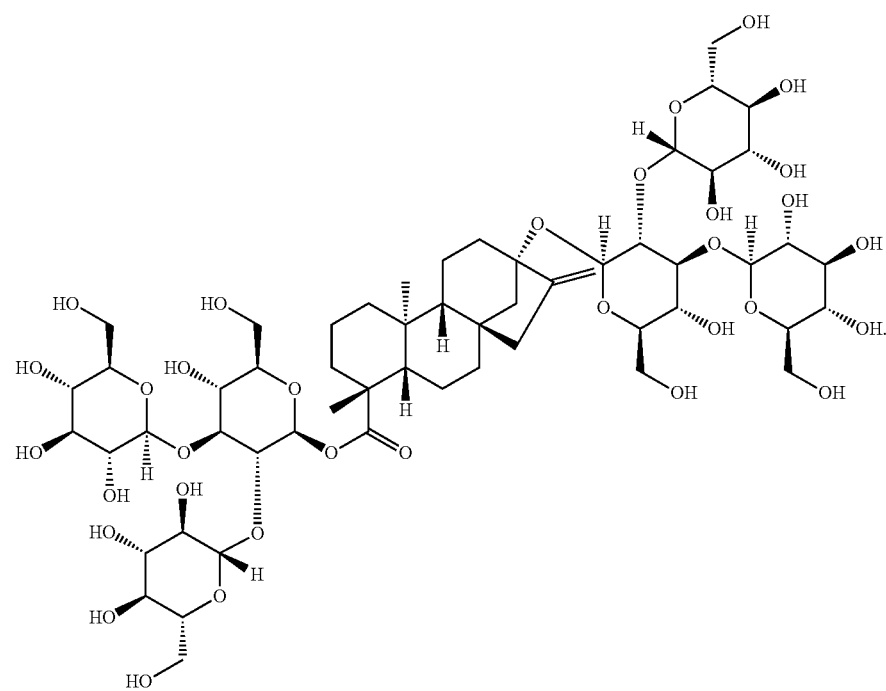
As used herein, "Rebaudioside M" refers to a steviol glycoside having the chemical following formula:

As used herein, "Rubusoside" refers to a steviol glycoside having the chemical following formula:

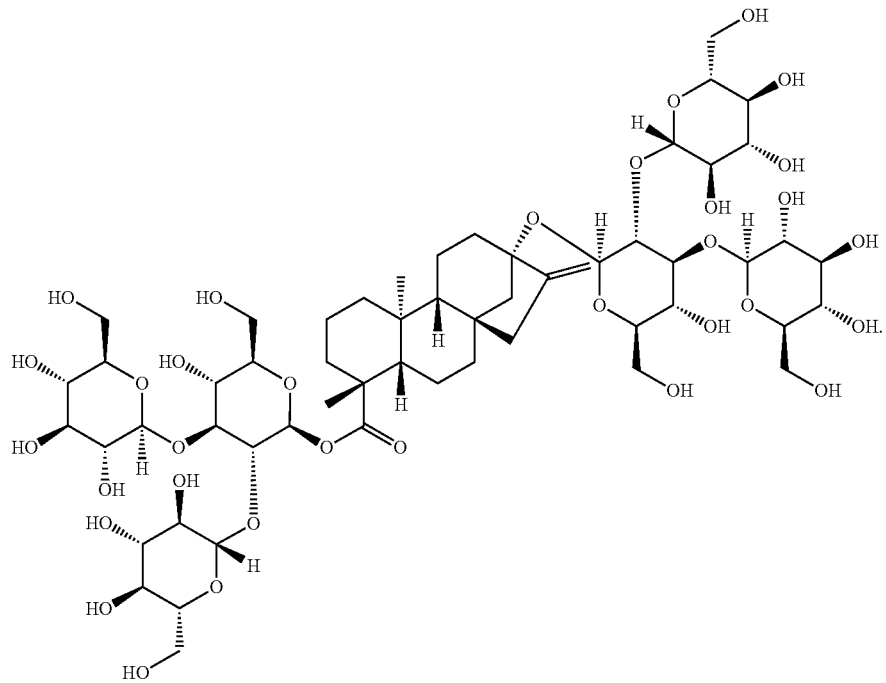

As used herein, "Steviolbioside" refers to a steviol glycoside having the chemical following formula:

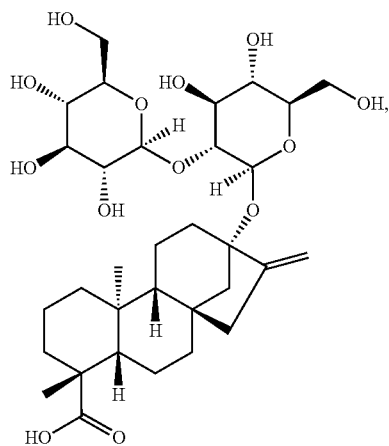

As used herein, the term "dietary fiber" refers to fiber that generally passes through the mouth and small intestine without being broken down by human digestive enzymes. Advantageously, dietary fibers are not broken down to glucose in the small intestine and do not significantly raise glucose levels after consumption.

As used herein, the term "soluble dietary fiber" refers to dietary fiber that dissolves in water (e.g., a starch). The soluble dietary fiber useful herein may include fermentable fiber (i.e., fiber partially or completely fermented by gastrointestinal microbiota in the large intestine to produce physiologically beneficial byproducts, such as short chain fatty acids, and gases) or non-fermentable fiber (e.g., psyllium, inulin, and resistant starch). Exemplary soluble dietary fibers include one or more of dextrin, resistant dextrin, maltodextrin, resistant maltodextrin, inulin, enzyme resistant starch, enzyme resistant modified starch, polydextrose, psyllium, non-starch polysaccharide, polycarbophil, chitin, pectin, guar gum, partially hydrolyzed guar gum, locust bean gum, carrageenan (particularly in kappa form), xanthan gum, konjac gum, beta-glucan, oligosaccharide, galactooligosaccharides and fructooligosaccharide. In some embodiments, the soluble dietary fiber is selected from tapioca fiber, maltodextrin, corn fiber, oat fiber, pea fiber, bean fiber, apple fiber, citrus fruit fiber, carrot fiber, potato fiber or psyllium fiber.

As used herein, a "masking agent" refers to a compound that blocks the flavor of another compound. In some embodiments, the masking agent blocks the bitter aftertaste of steviol glycoside. In some embodiments, the masking agent is a mushroom-based masking agent. In some embodiments, the mushroom-based masking agent comprises carbohydrate-based compounds (including chitin, β-glucans and glucuronic acid) as well as aminolipids (on one or two amino acids linked to a fatty acid through an amide bond, plus sometimes another through an ester bond), salts, amino acids, and nucleic acids. In some embodiments, sodium chloride is used in place of or in addition to other masking agents.

Modes for Carrying Out the Disclosure

The instant disclosure provides sugar-free compositions that have the same physical and taste properties of a simple syrup and that can be used a simple syrup substrate. The syrup substrate compositions of the instant disclosure leave a minimal or negligible aftertaste, and have substantially the same viscosity, mouth feel and texture as simple syrup.

The compositions of the instant disclosure are superior over sugar and simple syrups because they do not have added calories from caloric sugars while having substantially the same taste, viscosity, mouth feel and texture. In some embodiments, the compositions of the instant disclosure are superior because the soluble fiber in the composition helps regulate digestion, and slow down alcohol absorption if used together with alcoholic beverages. The compositions of the instant disclosure are superior over other sugar-free alternatives because the instant composition leaves a minimal or negligible aftertaste and has substantially the same taste, viscosity, mouth feel and texture as sugar or as a simple syrup. In some embodiments, the simple syrup is made up of 1:1 sugar:water. In some embodiments, the simple syrup is made up of 1:2 sugar:water On some embodiments, the compositions of the instant disclosure comprise ingredients as described herein with the recited percentages, and a food grade excipient, wherein the percentage of the ingredients and the percentage of the food grade excipient add up to 100% (w/w).

Suitable food grade excipients for sweetener compositions are well known in the art and include, for example, without limitation, solvents (including water, alcohol, ethanol, oils, fats, vegetable oil, and miglyol), binders, diluents, disintegrating agents, lubricants, flavoring agents, coloring agents, preservatives, antioxidants, emulsifiers, stabilizers, flavor-enhancers, anti-caking agents, and the like. Examples of such carriers or diluents may be found e.g. in "Perfume and Flavor Materials of Natural Origin", S. Arctander, Ed., Elizabeth, N.J., 1960; in "Perfume and Flavor Chemicals", S. Arctander, Ed., Vol. I & II, Allured Publishing Corporation, Carol Stream, USA, 1994; in "Flavourings", E. Ziegler and H. Ziegler (ed.), Wiley-VCH Weinheim, 1998, and "CTFA Cosmetic Ingredient Handbook", J. M. Nikitakis (ed.), 1st ed., The Cosmetic, Toiletry and Fragrance Association, Inc., Washington, 1988, which are incorporated herein in their entireties.

Also provided herein are methods for making the sweetener compositions and methods for sweetening a beverage or a food product using the compositions disclosed herein.

Simple-Syrup Substrate Compositions

In one aspect, the disclosure is directed to a sugar-free composition comprising, consisting essentially of, or further consisting of, by weight of the total composition: 0.0001-40% stevia leaf extract (e.g., 0.0001%, 0.0005%, 0.001%, 0.005%, 0.01%, 0.05%, 0.1%, 0.5%, 1%, 3%, 5%, 7%, 10%, 15%, 20%, 25%, 30%, 35%, 40%, or any value therebetween), 0.0001-40% Monk fruit (Luo Han Guo) extract (e.g., 0.0001%, 0.0005%, 0.001%, 0.005%, 0.01%, 0.05%, 0.1%, 0.5%, 1%, 3%, 5%, 7%, 10%, 11%, 12%, 13%, 14%, 15%, 16%, 17%, 18%, 19%, 20%, 25%, 30%, 35%, 40% or any value therebetween), 0.0001-10% at least one flavor (e.g., 0.0001%, 0.0005%, 0.001%, 0.005%, 0.01%, 0.05%, 0.1%, 0.5%, 1%, 3%, 5%, 7%, 10% or any value therebetween), and 50-99.9% dietary fiber (e.g., 50%, 55%, 60%, 65%, 70%, 75%, 80%, 85%, 90%, 95%, 99%, 99.9% or any value therebetween), wherein the composition has an approximate viscosity of between about 1000 and about 10000 centipoise at 20° C. (e.g., about 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, 6000, 6100, 6200, 6300, 6400, 6500, 6600, 6700, 6800, 6900, 7000, 7100, 7200, 7300, 7400, 7500, 7600, 7700, 7800, 7900, 8000, 8100, 8200, 8300, 8400, 8500, 8600, 8700, 8800, 8900, 9000, 9100, 9200, 9300, 9400, 9500, 9600, 9700, 9800, 0900, or 10000 centipoise at 20° C., or any value therebetween), optionally between about 2000 and about 5000 centipoise at 20° C. (e.g., 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, or 5000 centipoise at 20° C., or any value therebetween).

In one aspect, the disclosure is directed to a sugar-free composition comprising, consisting essentially of, or further consisting of, by weight of the total composition: 0.0001-40% stevia leaf extract (e.g., 0.0001%, 0.0005%, 0.001%, 0.005%, 0.01%, 0.05%, 0.1%, 0.5%, 1%, 3%, 5%, 7%, 10%, 15%, 20%, 25%, 30%, 35%, 40%, or any value therebetween), 0.0001-20% Monk fruit (Luo Han Guo) extract (e.g., 0.0001%, 0.0005%, 0.001%, 0.005%, 0.01%, 0.05%, 0.1%, 0.5%, 1%, 3%, 5%, 7%, 10%, 11%, 12%, 13%, 14%, 15%, 16%, 17%, 18%, 19%, 20% or any value therebetween), 0.0001-10% at least one flavor (e.g., 0.0001%, 0.0005%, 0.001%, 0.005%, 0.01%, 0.05%, 0.1%, 0.5%, 1%, 3%, 5%, 7%, 10% or any value therebetween), and 50-99.9% dietary fiber (e.g., 50%, 55%, 60%, 65%, 70%, 75%, 80%, 85%, 90%, 95%, 99%, 99.9% or any value therebetween), wherein the composition has an approximate viscosity of between about 1000 and about 10000 centipoise at 20° C. (e.g., about 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, 6000, 6100, 6200, 6300, 6400, 6500, 6600, 6700, 6800, 6900, 7000, 7100, 7200, 7300, 7400, 7500, 7600, 7700, 7800, 7900, 8000, 8100, 8200, 8300, 8400, 8500, 8600, 8700, 8800, 8900, 9000, 9100, 9200, 9300, 9400, 9500, 9600, 9700, 9800, 0900, or 10000 centipoise at 20° C., or any value therebetween), optionally between about 2000 and about 5000 centipoise at 20° C. (e.g., 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, or 5000 centipoise at 20° C., or any value therebetween).

In some embodiments, the composition comprises, consists essentially of, or further consists of, by weight of the total composition, 0.001-1% stevia leaf extract (e.g., 0.001%, 0.005%, 0.01%, 0.05%, 0.1%, 0.5%, 1%, or any value therebetween), 0.001-10% Monk fruit (Luo Han Guo) extract (e.g., 0.001%, 0.005%, 0.01%, 0.05%, 0.1%, 0.5%, 1%, 2%, 3%, 4%, 5%, 6%, 7%, 8%, 9%, 10% or any value therebetween), 0.001-1% at least one flavor (e.g., 0.001%, 0.005%, 0.01%, 0.05%, 0.1%, 0.5%, 1%, or any value therebetween), and 50-99.9% dietary fiber (e.g., 50%, 55%, 60%, 65%, 70%, 75%, 80%, 85%, 90%, 95%, 99%, 99.9% or any value therebetween), wherein the composition has an approximate viscosity of between about 1000 and about 10000 centipoise at 20° C. (e.g., about 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, 6000, 6100, 6200, 6300, 6400, 6500, 6600, 6700, 6800, 6900, 7000, 7100, 7200, 7300, 7400, 7500, 7600, 7700, 7800, 7900, 8000, 8100, 8200, 8300, 8400, 8500, 8600, 8700, 8800, 8900, 9000, 9100, 9200, 9300, 9400, 9500, 9600, 9700, 9800, 0900, or 10000 centipoise at 20° C.), optionally between about 2000 and about 5000 centipoise at 20° C. (e.g., 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, or 5000 centipoise at 20° C.).

In some embodiments, the composition comprises, consists essentially of, or further consists of, by weight of the total composition, 0.01-35% stevia leaf extract (e.g., 0.01%, 0.05%, 0.1%, 0.5%, 1%, 3%, 5%, 7%, 10%, 15%, 20%, 25%, 30%, 35%, or any value therebetween), 0.01-1% Monk fruit (Luo Han Guo) extract (e.g., 0.01%, 0.05%, 0.1%, 0.5%, 1% or any value therebetween), 0.01-1% at least one flavor (e.g., 0.01%, 0.05%, 0.1%, 0.5%, 1%, 3%, 5%, 7%, 10% or any value therebetween), and 50-70% dietary fiber (e.g., 50%, 55%, 60%, 65%, 70%, or any value therebetween), wherein the composition has an approximate viscosity of between about 1000 and about 10000 centipoise at 20° C. (e.g., about 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, 6000, 6100, 6200, 6300, 6400, 6500, 6600, 6700, 6800, 6900, 7000, 7100, 7200, 7300, 7400, 7500, 7600, 7700, 7800, 7900, 8000, 8100, 8200, 8300, 8400, 8500, 8600, 8700, 8800, 8900, 9000, 9100, 9200, 9300, 9400, 9500, 9600, 9700, 9800, 0900, or 10000 centipoise at 20° C., or any value therebetween), optionally between about 2000 and about 5000 centipoise at 20° C. (e.g., 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, or 5000 centipoise at 20° C., or any value therebetween).

In some embodiments, the composition comprises, consists essentially of, or further consists of, by weight of the total composition, 5-30% stevia leaf extract (e.g., 5%, 7%, 10%, 15%, 20%, 25%, 30% or any value therebetween), 0.1-1% Monk fruit (Luo Han Guo) extract (e.g., 0.1%, 0.2%, 0.5%, 0.7%, 1% or any value therebetween), 0.1-1% at least one flavor (e.g., 0.1%, 0.2%, 0.5%, 0.7%, 1% or any value therebetween), and 50-70% dietary fiber (e.g., 50%, 55%, 60%, 65%, 70%, or any value therebetween), wherein the composition has an approximate viscosity of between about 1000 and about 10000 centipoise at 20° C. (e.g., about 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, 6000, 6100, 6200, 6300, 6400, 6500, 6600, 6700, 6800, 6900, 7000, 7100, 7200, 7300, 7400, 7500, 7600, 7700, 7800, 7900, 8000, 8100, 8200, 8300, 8400, 8500, 8600, 8700, 8800, 8900, 9000, 9100, 9200, 9300, 9400, 9500, 9600, 9700, 9800, 0900, or 10000 centipoise at 20° C., or any value therebetween), optionally between about 2000 and about 5000 centipoise at 20° C. (e.g., 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, or 5000 centipoise at 20° C., or any value therebetween).

In some embodiments, the composition further comprises 0.0001-40% steviol glycoside (e.g., 0.0001%, 0.0005%, 0.001%, 0.005%, 0.01%, 0.05%, 0.1%, 0.5%, 1%, 3%, 5%, 7%, 10%, 15%, 20%, 25%, 30%, 35%, 40%, or any value therebetween). In some embodiments, the composition further comprises 0.001-35% steviol glycoside (e.g., 0.001%, 0.005%, 0.01%, 0.05%, 0.1%, 0.5%, 1%, 3%, 5%, 7%, 10%, 15%, 20%, 25%, 30%, 35%, or any value therebetween). In some embodiments, the composition further comprises 0.01-30% steviol glycoside (e.g., 0.01%, 0.05%, 0.1%, 0.5%, 1%, 3%, 5%, 7%, 10%, 15%, 20%, 25%, 30%, 35%, or any value therebetween). In some embodiments, the composition further comprises 5-30% steviol glycoside (e.g., 5%, 7%, 10%, 15%, 20%, 25%, 30%, or any value therebetween).

In some embodiments, the steviol glycoside comprises, consists essentially of, or further consists of one or more steviol glycoside selected from Stevioside, Dulcoside A, Rebaudioside A, Rebaudioside B, Rebaudioside C, Rebaudioside D, Rebaudioside E, Rebaudioside F, Rebaudioside M, Rubusoside, and Steviolbioside.

In some embodiments, the steviol glycoside comprises, consists essentially of, or further consists of Rebaudioside M.

In some embodiments, the flavor is a natural or artificial flavor selected from vanilla flavor, caramel flavor, bourbon flavor, molasses flavor, lemon flavor, amyl acetate, citral, geraniol, anise essential oil, benzaldehyde, acetoin, or massoia lactone, or an artificial flavor such as vanillin or ethylvanillin; or a natural or artificial flavor selected for its caramel or vanilla notes such as pecan, maple or rum flavor.

In some embodiments, the at least one flavor is a natural or artificial flavor selected from vanilla flavor or caramel flavor. In some embodiments, the at least one flavor comprises both a vanilla flavor and a caramel flavor. In some embodiments, the at least one flavor is a natural or artificial flavor selected from bourbon flavor or molasses flavor.

In some embodiments, the dietary fiber comprises, consists essentially of, or further consists of a soluble dietary fiber. In some embodiments, the soluble dietary fiber is selected from tapioca fiber, maltodextrin, corn fiber, oat fiber, pea fiber, bean fiber, apple fiber, citrus fruit fiber, carrot fiber, potato fiber, galacto-oligosaccharides or psyllium fiber. In a specific embodiment, the soluble dietary fiber comprises, consists essentially of, or further consists of tapioca fiber. In a specific embodiment, the soluble dietary fiber comprises, consists essentially of, or further consists of maltodextrin.

In some embodiments, the composition further comprises 0.1-1% at least one anti-caking agent (e.g., 0.1%, 0.2%, 0.5%, 0.7%, 1% or any value therebetween). In some embodiments, the at least one anti-caking agent comprises, consists essentially of, or further consists of tricalcium phosphate, powdered cellulose, magnesium stearate, sodium bicarbonate, sodium ferrocyanide, potassium ferrocyanide, calcium ferrocyanide, calcium phosphate, sodium silicate, silicon dioxide, calcium silicate, magnesium trisilicate, talcum powder, sodium aluminosilicate, potassium aluminum silicate, calcium aluminosilicate, bentonite, aluminum silicate, stearic acid, or polydimethylsiloxane.

In some embodiments, the combined amount of the stevia leaf extract and the steviol glycoside is less than 2%, or alternatively less than 1% or alternatively less than 0.5% of the total weight of the composition.

In some embodiments, the combined amount of the stevia leaf extract and the steviol glycoside less than 50%, or alternatively less than 40%, or alternatively less than 30%, or alternatively less than 20%, or alternatively less than 10% or alternatively less than 5% of the total weight of the composition.

In some embodiments, the composition further comprises, or consists essentially of, or consists of 0.0001-10% masking agent (e.g., 0.0001%, 0.0005%, 0.001%, 0.005%, 0.01%, 0.05%, 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10% or any value therebetween).

In some embodiments, the composition further comprises, or consists essentially of, or consists of 0.0001-1% masking agent (e.g., 0.0001%, 0.0005%, 0.001%, 0.005%, 0.01%, 0.05%, 0.1%, 0.5%, 1% or any value therebetween).

In some embodiments, the composition further comprises 0.0001-20% (e.g., 0.0001%, 0.0005%, 0.001%, 0.005%, 0.01%, 0.05%, 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 11%, 12%, 13%, 14%, 15%, 16%, 17%, 18%, 19%, 20% or any value therebetween) sodium chloride (table salt).

In some embodiments, the composition further comprises 0.0001-10% (e.g., 0.0001%, 0.0005%, 0.001%, 0.005%, 0.01%, 0.05%, 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10 or any value therebetween) sodium chloride (table salt).

In some embodiments, the composition further comprises 0.0001-5% (e.g., 0.0001%, 0.0005%, 0.001%, 0.005%, 0.01%, 0.05%, 0.1%, 0.5%, 1%, 1.5%, 2%, 2.5%, 3%, 3.5%, 4%, 4.5%, 5% or any value therebetween) sodium chloride (table salt). In some embodiments, sodium chloride reduces bitterness of the composition.

In some embodiments, the composition is comprised of ingredients meeting USDA standards for organic ingredients, and can be labeled as 'USDA Organic' or 'USDA Organic-compliant'.

In some embodiments, the viscosity of the composition is approximately identical to the viscosity of a simple syrup made up of 1:1 (1 part: 1 part) sugar:water. In some embodiments, the viscosity of the composition is at least 50%, at least 60%, at least 70%, at least 80%, at least 90%, at least 95% or at least 99% of the viscosity of a simple syrup made up of made up of 1:1 sugar:water. In some embodiments, the viscosity of the composition is approximately substantially identical to simple syrup. In some embodiments, the composition has substantially the same mouth feel and texture as simple syrup.

Another aspect of the disclosure is directed to an edible or potable composition, optionally a beverage, comprising the composition of the instant disclosure, wherein the composition is the major source of sweetener in the edible or potable composition (e.g., provides at least 80%, 85%, 90%, 95%, 99% or more of the sweetness of the edible or potable composition). In some embodiments, the edible composition is a food product.

Sugar-Free Sweetener Compositions

Another aspect of the disclosure is directed to sugar-free sweetener compositions that leave a minimal or negligible aftertaste.

In some embodiments, the sweetener composition comprises, consists essentially of, or further consists of, by weight of the total composition: 0.5-55% of stevia leaf extract (e.g., 0.5%, 1%, 3%, 5%, 7%, 10%, 15%, 20%, 25%, 30%, 35%, 40%, 45, 50%, 55% or any value therebetween), 0.1-40% of Monk fruit (Luo Han Guo) extract (e.g., 0.1%, 0.2%, 0.5%, 0.7%, 0.9%, 1%, 2%, 3%, 4%, 5%, 5.5%, 6%, 6.5%, 7%, 7.5%, 8%, 8.5%, 9%, 9.5%, 10%, 15%, 20%, 25%, 30%, 35%, 40% or any value therebetween), 0.1%-5% of at least one flavor (e.g., 0.1%, 0.2%, 0.5%, 0.7%, 0.9%, 1%, 2%, 3%, 4%, 5% or any value therebetween), and 0.0001-10% (e.g., 0.0001%, 0.0005%, 0.001%, 0.005%, 0.01%, 0.05%, 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10% or any value therebetween) masking agent.

In some embodiments, the sweetener composition comprises, consists essentially of, or further consists of, by weight of the total composition: 0.5-55% of stevia leaf extract (e.g., 0.5%, 1%, 3%, 5%, 7%, 10%, 15%, 20%, 25%, 30%, 35%, 40%, 45%, 50%, 55% or any value therebetween), 0.1-20% (e.g., 0.1%, 0.2%, 0.5%, 0.7%, 0.9%, 1%, 2%, 3%, 4%, 5%, 5.5%, 6%, 6.5%, 7%, 7.5%, 8%, 8.5%, 9%, 9.5%, 10%, 15%, 20% or any value therebetween) of Monk fruit (Luo Han Guo) extract, 0.1%-5% of at least one flavor (e.g., 0.1%, 0.2%, 0.5%, 0.7%, 0.9%, 1%, 2%, 3%, 4%, 5% or any value therebetween), and 0.0001-5% (e.g., 0.0001%, 0.0005%, 0.001%, 0.005%, 0.01%, 0.05%, 0.1%, 0.5%, 1%, 1.5%, 2%, 2.5%, 3%, 3.5%, 4%, 4.5%, 5% or any value therebetween) masking agent.

In some embodiments, the sweetener composition comprises, consists essentially of, or further consists of, by weight of the total composition: 0.5-55% of stevia leaf extract (e.g., 0.5%, 1%, 3%, 5%, 7%, 10%, 15%, 20%, 25%, 30%, 35%, 40%, 45%, 50%, 55% or any value therebetween), 0.1-5% of Monk fruit (Luo Han Guo) extract (e.g., 0.1%, 0.2%, 0.5%, 0.7%, 0.9%, 1%, 2%, 3%, 4%, 5% or any value therebetween), 0.1%-5% of at least one flavor (e.g., 0.1%, 0.2%, 0.5%, 0.7%, 0.9%, 1%, 2%, 3%, 4%, 5% or any value therebetween), and 0.0001-1% (e.g., 0.0001%, 0.0005%, 0.001%, 0.005%, 0.01%, 0.05%, 0.1%, 0.5%, 1% or any value therebetween) masking agent.

Another aspect of the disclosure is directed to a sweetener composition comprising, or consisting essentially of, or consisting of, by weight of the total composition: 0.5-45% (e.g., 0.5%, 1%, 3%, 5%, 7%, 10%, 15%, 20%, 25%, 30%, 35%, 40%, 45% or any value therebetween) of stevia leaf extract, 0.1-20% (e.g., 0.1%, 0.2%, 0.5%, 0.7%, 0.9%, 1%, 2%, 3%, 4%, 5%, 5.5%, 6%, 6.5%, 7%, 7.5%, 8%, 8.5%, 9%, 9.5%, 10%, 15%, 20% or any value therebetween) of at least one flavor, and 0.0001-10% (e.g., 0.0001%, 0.0005%, 0.001%, 0.005%, 0.01%, 0.05%, 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10% or any value therebetween) masking agent.

Another aspect of the disclosure is directed to a sweetener composition comprising, or consisting essentially of, or consisting of, by weight of the total composition: 0.5-50% (e.g., 0.5%, 1%, 3%, 5%, 7%, 10%, 15%, 20%, 25%, 30%, 35%, 40%, 45%, 50% or any value therebetween) of stevia leaf extract, 0.1-10% (e.g., 0.1%, 0.2%, 0.5%, 0.7%, 0.9%, 1%, 2%, 3%, 4%, 5%, 5.5%, 6%, 6.5%, 7%, 7.5%, 8%, 8.5%, 9%, 9.5%, 10% or any value therebetween) of Monk fruit (Luo Han Guo) extract, 0.1-20% (e.g., 0.1%, 0.2%, 0.5%, 0.7%, 0.9%, 1%, 2%, 3%, 4%, 5%, 5.5%, 6%, 6.5%, 7%, 7.5%, 8%, 8.5%, 9%, 9.5%, 10%, 15%, 20% or any value therebetween) of at least one flavor, and 0.0001-10% (e.g., 0.0001%, 0.0005%, 0.001%, 0.005%, 0.01%, 0.05%, 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10% or any value therebetween) masking agent.

In some embodiments, the sweetener composition further comprises, or consists essentially of, or yet further consists of 0.5-55% of steviol glycoside (e.g., 0.5%, 1%, 3%, 5%, 7%, 10%, 15%, 20%, 25%, 30%, 35%, 40%, 45, 50%, 55% or any value therebetween). In some embodiments, the steviol glycoside comprises, consists essentially of, or further consists of one or more steviol glycoside selected from Stevioside, Dulcoside A, Rebaudioside A, Rebaudioside B, Rebaudioside C, Rebaudioside D, Rebaudioside E, Rebaudioside F, Rebaudioside M, Rubusoside, and Steviolbioside.

In some embodiments, the steviol glycoside comprises, consists essentially of, or further consists of Rebaudioside M.

In some embodiments, the at least one flavor is a natural or artificial flavor selected from vanilla flavor, caramel flavor, bourbon flavor, molasses flavor, lemon flavor, amyl acetate, citral, geraniol, anise essential oil, benzaldehyde, acetoin, or massoia lactone, or an artificial flavor such as vanillin or ethylvanillin; or a natural or artificial flavor selected for its caramel or vanilla notes such as pecan, maple or rum flavor.

In some embodiments, the at least one flavor is a natural flavor selected from vanilla flavor and caramel flavor. In some embodiments, the at least one flavor comprises bot a vanilla flavor and a caramel flavor. In some embodiments, the at least one flavor is a natural flavor selected from bourbon flavor or molasses flavor. In some embodiments, the vanilla flavor and the caramel flavor, or the bourbon flavor alone or the molasses flavor give the composition a premium sugar taste with some molasses content.

In some embodiments, the sweetener composition is a liquid composition.

In some embodiments, the composition further comprises, consists essentially of, or further consists of 1-95% dietary fiber (e.g., 1%, 5%, 10%, 15%, 20%, 25,%, 30%, 35%, 40%, 45%, 50%, 55%, 60%, 65%, 70%, 75%, 80%, 85%, 90%, 95% or any value therebetween).

In some embodiments, the composition further comprises, consists essentially of, or further consists of 1-65% dietary fiber (e.g., 1%, 5%, 10%, 15%, 20%, 25,%, 30%, 35%, 40%, 45%, 50%, 55%, 60%, 65% or any value therebetween).

In some embodiments, the dietary fiber comprises, consists essentially of, or further consists of a soluble dietary fiber. In some embodiments, the soluble dietary fiber is selected from tapioca fiber, maltodextrin, corn fiber, oat fiber, pea fiber, bean fiber, apple fiber, citrus fruit fiber, carrot fiber, potato fiber or psyllium fiber.

In some embodiments, the sweetener composition has an approximate viscosity of between about 1000 and about 10000 centipoise at 20° C. (e.g., about 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, 6000, 6100, 6200, 6300, 6400, 6500, 6600, 6700, 6800, 6900, 7000, 7100, 7200, 7300, 7400, 7500, 7600, 7700, 7800, 7900, 8000, 8100, 8200, 8300, 8400, 8500, 8600, 8700, 8800, 8900, 9000, 9100, 9200, 9300, 9400, 9500, 9600, 9700, 9800, 0900, or 10000 centipoise at 20° C., or any value therebetween), optionally between about 2000 and about 5000 centipoise at 20° C. (e.g., 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, or 5000 centipoise at 20° C., or any value therebetween).

In some embodiments, the sweetener composition further comprises 0.0001-20% (e.g., 0.0001%, 0.0005%, 0.001%, 0.005%, 0.01%, 0.05%, 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 11%, 12%, 13%, 14%, 15%, 16%, 17%, 18%, 19%, 20% or any value therebetween) sodium chloride (table salt).

In some embodiments, the sweetener composition further comprises 0.0001-10% (e.g., 0.0001%, 0.0005%, 0.001%, 0.005%, 0.01%, 0.05%, 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10 or any value therebetween) sodium chloride (table salt).

In some embodiments, the sweetener composition further comprises 0.0001-5% (e.g., 0.0001%, 0.0005%, 0.001%, 0.005%, 0.01%, 0.05%, 0.1%, 0.5%, 1%, 1.5%, 2%, 2.5%, 3%, 3.5%, 4%, 4.5%, 5% or any value therebetween) sodium chloride (table salt).

In some embodiments, sodium chloride reduces bitterness of the sweetener composition.

In some embodiments, the sweetener composition is comprised of ingredients meeting USDA standards for organic ingredients, and can be labeled as 'USDA Organic' or 'USDA Organic-compliant'.

In some embodiments, the sweetener composition further comprises, or consists essentially of, or yet further consists of 0.1-1% at least one anti-caking agent (e.g., 0.1%, 0.2%, 0.5%, 0.7%, 1% or any value therebetween). In some embodiments, the at least one anti-caking agent comprises, consists essentially of, or further consists of tricalcium phosphate, powdered cellulose, magnesium stearate, sodium bicarbonate, sodium ferrocyanide, potassium ferrocyanide, calcium ferrocyanide, calcium phosphate, sodium silicate, silicon dioxide, calcium silicate, magnesium trisilicate, talcum powder, sodium aluminosilicate, potassium aluminum silicate, calcium aluminosilicate, bentonite, aluminum silicate, stearic acid, or polydimethylsiloxane.

In some embodiments, the sweetener composition is formulated as a solid composition, preferably a powdered composition. In some embodiments, the sweetener composition is a lyophilized (freeze-dried) composition. In some embodiments, the sweetener is a liquid concentrate.

In some embodiments, the sweetener composition is formulated as a powdered composition comprising, consisting essentially of, or further consisting of, by weight of the total composition, 80-95% dietary fiber (e.g., 80%, 85%, 90%, 95% or any value therebetween), 0.5-15% of stevia leaf extract (e.g., 0.5%, 1%, 3%, 5%, 7%, 10%, 15% or any value therebetween), 0.1-10% of Monk fruit (Luo Han Guo) extract (e.g., 0.1%, 0.2%, 0.5%, 0.7%, 0.9%, 1%, 2%, 3%, 4%, 5%, 5.5%, 6%, 6.5%, 7%, 7.5%, 8%, 8.5%, 9%, 9.5%, 10% or any value therebetween), 0.1%-5% of at least one flavor (e.g., 0.1%, 0.2%, 0.5%, 0.7%, 0.9%, 1%, 2%, 3%, 4%, 5% or any value therebetween), and 0.0001-5% (e.g., 0.0001%, 0.0005%, 0.001%, 0.005%, 0.01%, 0.05%, 0.1%, 0.5%, 1%, 1.5%, 2%, 2.5%, 3%, 3.5%, 4%, 4.5%, 5% or any value therebetween) masking agent.

In some embodiments, the sweetener composition is formulated as a powdered composition comprising, consisting essentially of, or further consisting of, by weight of the total composition, 80-99% dietary fiber (e.g., 80%, 85%, 90%, 95%, 97%, 99% or any value therebetween), 0.5-10% of stevia leaf extract (e.g., 0.5%, 1%, 3%, 5%, 7%, 10% or any value therebetween), 0.1-10% of Monk fruit (Luo Han Guo) extract (e.g., 0.1%, 0.2%, 0.3%, 0.4%, 0.5%, 0.6%, 0.7%, 0.8%, 0.9%, 1%, 2%, 3%, 4%, 5%, 5.5%, 6%, 6.5%, 7%, 7.5%, 8%, 8.5%, 9%, 9.5%, 10% or any value therebetween), 0.1%-5% of at least one flavor (e.g., 0.1%, 0.2%, 0.5%, 0.7%, 0.9%, 1%, 2%, 3%, 4%, 5% or any value therebetween), and 0.0001-5% (e.g., 0.0001%, 0.0005%, 0.001%, 0.005%, 0.01%, 0.05%, 0.1%, 0.5%, 1%, 1.5%, 2%, 2.5%, 3%, 3.5%, 4%, 4.5%, 5% or any value therebetween) masking agent.

In some embodiments, the sweetener composition is formulated as a powdered composition comprising, consisting essentially of, or further consisting of, by weight of the total composition, 90-99% dietary fiber (e.g., 90%, 95%, 97%, 99% or any value therebetween), 0.5-4% of stevia leaf extract (e.g., 0.5%, 0.7%, 0.9%, 1%, 2%, 3%, 4% or any value therebetween), 0.1-4% of Monk fruit (Luo Han Guo) extract (e.g., 0.1%, 0.2%, 0.3%, 0.4%, 0.5%, 0.6%, 0.7%, 0.8%, 0.9%, 1%, 2%, 3%, 4% or any value therebetween), 0.1%-3% of at least one flavor (e.g., 0.1%, 0.2%, 0.5%, 0.7%, 0.9%, 1%, 2%, 3% or any value therebetween), and 0.0001-2% (e.g., 0.0001%, 0.0005%, 0.001%, 0.005%, 0.01%, 0.05%, 0.1%, 0.5%, 1%, 1.5%, 2% or any value therebetween) masking agent.

In some embodiments, the sweetener composition is added to beverages. In some embodiments, the sweetener composition added to beverages is in a liquid form. In some embodiments, the sweetener composition added to beverages is in a powdered form.

In some embodiments, the sweetener composition is added to food products. In some embodiments, the sweetener composition is used in gummies, candies, or desserts.

Methods for Making a Sweetener Composition

Another aspect of the disclosure is directed to methods for making a sweetener composition, comprising, or consisting essentially of, or consisting of: admixing, by weight of the total composition: 0.0001-40% stevia leaf extract (e.g., 0.0001%, 0.0005%, 0.001%, 0.005%, 0.01%, 0.05%, 0.1%, 0.5%, 1%, 3%, 5%, 7%, 10%, 15%, 20%, 25%, 30%, 35%, 40%, or any value therebetween), 0.0001-40% Monk fruit (Luo Han Guo) extract (e.g., 0.0001%, 0.0005%, 0.001%, 0.005%, 0.01%, 0.05%, 0.1%, 0.5%, 1%, 3%, 5%, 7%, 10%, 11%, 12%, 13%, 14%, 15%, 16%, 17%, 18%, 19%, 20%, 25%, 30%, 35%, 40% or any value therebetween), 0.0001-10% at least one flavor (e.g., 0.0001%, 0.0005%, 0.001%, 0.005%, 0.01%, 0.05%, 0.1%, 0.5%, 1%, 3%, 5%, 7%, 10% or any value therebetween), 50-99.9% dietary fiber (e.g., 50%, 55%, 60%, 65%, 70%, 75%, 80%, 85%, 90%, 95%, 99%, 99.9% or any value therebetween), and 0.0001-10% (e.g., 0.0001%, 0.0005%, 0.001%, 0.005%, 0.01%, 0.05%, 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10% or any value therebetween) masking agent wherein the composition has an approximate viscosity of between about 1000 and about 10000 centipoise at 20° C. (e.g., about 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, 6000, 6100, 6200, 6300, 6400, 6500, 6600, 6700, 6800, 6900, 7000, 7100, 7200, 7300, 7400, 7500, 7600, 7700, 7800, 7900, 8000, 8100, 8200, 8300, 8400, 8500, 8600, 8700, 8800, 8900, 9000, 9100, 9200, 9300, 9400, 9500, 9600, 9700, 9800, 0900, or 10000 centipoise at 20° C., or any value therebetween), optionally between about 2000 and about 5000 centipoise at 20° C. (e.g., 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, or 5000 centipoise at 20° C., or any value therebetween).

Another aspect of the disclosure is directed to methods for making a sweetener composition, comprising, or consisting essentially of, or consisting of: admixing, by weight of the total composition: 0.0001-40% stevia leaf extract (e.g., 0.0001%, 0.0005%, 0.001%, 0.005%, 0.01%, 0.05%, 0.1%, 0.5%, 1%, 3%, 5%, 7%, 10%, 15%, 20%, 25%, 30%, 35%, 40%, or any value therebetween), 0.0001-20% Monk fruit (Luo Han Guo) extract (e.g., 0.0001%, 0.0005%, 0.001%, 0.005%, 0.01%, 0.05%, 0.1%, 0.5%, 1%, 3%, 5%, 7%, 10%, 11%, 12%, 13%, 14%, 15%, 16%, 17%, 18%, 19%, 20% or any value therebetween), 0.0001-10% at least one flavor (e.g., 0.0001%, 0.0005%, 0.001%, 0.005%, 0.01%, 0.05%, 0.1%, 0.5%, 1%, 3%, 5%, 7%, 10% or any value therebetween), 50-99.9% dietary fiber (e.g., 50%, 55%, 60%, 65%, 70%, 75%, 80%, 85%, 90%, 95%, 99%, 99.9% or any value therebetween), and 0.0001-1% (e.g., 0.0001%, 0.0005%, 0.001%, 0.005%, 0.01%, 0.05%, 0.1%, 0.5%, 1% or any value therebetween) masking agent wherein the composition has an approximate viscosity of between about 1000 and about 10000 centipoise at 20° C. (e.g., about 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, 6000, 6100, 6200, 6300, 6400, 6500, 6600, 6700, 6800, 6900, 7000, 7100, 7200, 7300, 7400, 7500, 7600, 7700, 7800, 7900, 8000, 8100, 8200, 8300, 8400, 8500, 8600, 8700, 8800, 8900, 9000, 9100, 9200, 9300, 9400, 9500, 9600, 9700, 9800, 0900, or 10000 centipoise at 20° C., or any value therebetween), optionally between about 2000 and about 5000 centipoise at 20° C. (e.g., 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, or 5000 centipoise at 20° C., or any value therebetween).

In some embodiments, the method comprises, consists essentially of, or further consists of admixing, by weight of the total composition, 0.001-1% stevia leaf extract (e.g., 0.001%, 0.005%, 0.01%, 0.05%, 0.1%, 0.5%, 1%, or any value therebetween), 0.001-10% Monk fruit (Luo Han Guo) extract (e.g., 0.001%, 0.005%, 0.01%, 0.05%, 0.1%, 0.5%, 1%, 2%, 3%, 4%, 5%, 6%, 7%, 8%, 9%, 10% or any value therebetween), 0.001-1% at least one flavor (e.g., 0.001%, 0.005%, 0.01%, 0.05%, 0.1%, 0.5%, 1%, or any value therebetween), and 50-99.9% dietary fiber (e.g., 50%, 55%, 60%, 65%, 70%, 75%, 80%, 85%, 90%, 95%, 99%, 99.9% or any value therebetween), wherein the composition has an approximate viscosity of between about 1000 and about 10000 centipoise at 20° C. (e.g., about 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, 6000, 6100, 6200, 6300, 6400, 6500, 6600, 6700, 6800, 6900, 7000, 7100, 7200, 7300, 7400, 7500, 7600, 7700, 7800, 7900, 8000, 8100, 8200, 8300, 8400, 8500, 8600, 8700, 8800, 8900, 9000, 9100, 9200, 9300, 9400, 9500, 9600, 9700, 9800, 0900, or 10000 centipoise at 20° C.), optionally between about 2000 and about 5000 centipoise at 20° C. (e.g., 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, or 5000 centipoise at 20° C.).

In some embodiments, the method comprises, consists essentially of, or further consists of admixing, by weight of the total composition, 0.01-35% stevia leaf extract (e.g., 0.01%, 0.05%, 0.1%, 0.5%, 1%, 3%, 5%, 7%, 10%, 15%, 20%, 25%, 30%, 35%, or any value therebetween), 0.01-1% Monk fruit (Luo Han Guo) extract (e.g., 0.01%, 0.05%, 0.1%, 0.5%, 1% or any value therebetween), 0.01-1% at least one flavor (e.g., 0.01%, 0.05%, 0.1%, 0.5%, 1%, 3%, 5%, 7%, 10% or any value therebetween), and 50-70% dietary fiber (e.g., 50%, 55%, 60%, 65%, 70%, or any value therebetween), wherein the composition has an approximate viscosity of between about 1000 and about 10000 centipoise at 20° C. (e.g., about 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, 6000, 6100, 6200, 6300, 6400, 6500, 6600, 6700, 6800, 6900, 7000, 7100, 7200, 7300, 7400, 7500, 7600, 7700, 7800, 7900, 8000, 8100, 8200, 8300, 8400, 8500, 8600, 8700, 8800, 8900, 9000, 9100, 9200, 9300, 9400, 9500, 9600, 9700, 9800, 0900, or 10000 centipoise at 20° C., or any value therebetween), optionally between about 2000 and about 5000 centipoise at 20° C. (e.g., 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, or 5000 centipoise at 20° C., or any value therebetween).

In some embodiments, the method comprises, consists essentially of, or further consists of admixing, by weight of the total composition, 5-30% stevia leaf extract (e.g., 5%, 7%, 10%, 15%, 20%, 25%, 30% or any value therebetween), 0.1-1% Monk fruit (Luo Han Guo) extract (e.g., 0.1%, 0.2%, 0.3%, 0.4%, 0.5%, 0.6%, 0.7%, 0.8%, 0.9%, 1% or any value therebetween), 0.1-1% at least one flavor (e.g., 0.1%, 0.2%, 0.5%, 0.7%, 1% or any value therebetween), and 50-70% dietary fiber (e.g., 50%, 55%, 60%, 65%, 70%, or any value therebetween), wherein the composition has an approximate viscosity of between about 1000 and about 10000 centipoise at 20° C. (e.g., about 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, 6000, 6100, 6200, 6300, 6400, 6500, 6600, 6700, 6800, 6900, 7000, 7100, 7200, 7300, 7400, 7500, 7600, 7700, 7800, 7900, 8000, 8100, 8200, 8300, 8400, 8500, 8600, 8700, 8800, 8900, 9000, 9100, 9200, 9300, 9400, 9500, 9600, 9700, 9800, 0900, or 10000 centipoise at 20° C., or any value therebetween), optionally between about 2000 and about 5000 centipoise at 20° C. (e.g., 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, or 5000 centipoise at 20° C., or any value therebetween).

In some embodiments, the method comprises, consists essentially of, or further consists of further admixing 0.0001-40% steviol glycoside (e.g., 0.0001%, 0.0005%, 0.001%, 0.005%, 0.01%, 0.05%, 0.1%, 0.5%, 1%, 3%, 5%, 7%, 10%, 15%, 20%, 25%, 30%, 35%, 40%, or any value therebetween). In some embodiments, the composition further comprises 0.001-35% steviol glycoside (e.g., 0.001%, 0.005%, 0.01%, 0.05%, 0.1%, 0.5%, 1%, 3%, 5%, 7%, 10%, 15%, 20%, 25%, 30%, 35%, or any value therebetween). In some embodiments, the composition further comprises 0.01-30% steviol glycoside (e.g., 0.01%, 0.05%, 0.1%, 0.5%, 1%, 3%, 5%, 7%, 10%, 15%, 20%, 25%, 30%, 35%, or any value therebetween). In some embodiments, the composition further comprises 5-30% steviol glycoside (e.g., 5%, 7%, 10%, 15%, 20%, 25%, 30%, or any value therebetween).

In some embodiments, the steviol glycoside comprises, consists essentially of, or further consists of one or more steviol glycoside selected from Stevioside, Dulcoside A, Rebaudioside A, Rebaudioside B, Rebaudioside C, Rebaudioside D, Rebaudioside E, Rebaudioside F, Rebaudioside M, Rubusoside, and Steviolbioside.

In some embodiments, the steviol glycoside comprises, consists essentially of, or further consists of Rebaudioside M.

In some embodiments, the flavor is a natural or artificial flavor selected from vanilla flavor, caramel flavor, bourbon flavor, molasses flavor, lemon flavor, amyl acetate, citral, geraniol, anise essential oil, benzaldehyde, acetoin, and massoia lactone.

In some embodiments, the at least one flavor is a natural or artificial flavor selected from vanilla flavor or caramel flavor. In some embodiments, the at least one flavor comprises both a vanilla flavor and a caramel flavor. In some embodiments, the at least one flavor is a natural or artificial flavor selected from bourbon flavor or molasses flavor.

In some embodiments, the dietary fiber comprises, consists essentially of, or further consists of a soluble dietary fiber. In some embodiments, the soluble dietary fiber is selected from tapioca fiber, maltodextrin, corn fiber, oat fiber, pea fiber, bean fiber, apple fiber, citrus fruit fiber, carrot fiber, potato fiber, galacto-oligosaccharides or psyllium fiber. In a specific embodiment, the soluble dietary fiber comprises, consists essentially of, or further consists of tapioca fiber. In a specific embodiment, the soluble dietary fiber comprises, consists essentially of, or further consists of maltodextrin.

In some embodiments, the method comprises, consists essentially of, or further consists of further admixing 0.0001-10% masking agent (e.g., 0.0001%, 0.0005%, 0.001%, 0.005%, 0.01%, 0.05%, 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10% or any value therebetween).

In some embodiments, the method comprises, consists essentially of, or further consists of further admixing 0.0001-5% masking agent (e.g., 0.0001%, 0.0005%, 0.001%, 0.005%, 0.01%, 0.05%, 0.1%, 0.5%, 1%, 1.5%, 2%, 2.5%, 3%, 3.5%, 4%, 4.5%, 5% or any value therebetween).

In some embodiments, the method comprises, consists essentially of, or further consists of further admixing 0.0001-1% masking agent (e.g., 0.0001%, 0.0005%, 0.001%, 0.005%, 0.01%, 0.05%, 0.1%, 0.5%, 1% or any value therebetween).

Methods for Sweetening a Beverage or Food Product

Another aspect of the disclosure is directed to methods for sweetening a beverage or a food product comprising adding to the beverage or food product the compositions of the instant disclosure. In some embodiments, the added composition is the major sweetener in the beverage after the addition is the added composition (e.g., the added composition provides at least 80%, 85%, 90%, 95%, 99% or more of the sweetness of the beverage or food product).

In some embodiments, the composition is added at 0.1%-20% by weight of the total beverage or food product (e.g., 0.1%, 0.2%, 0.5%, 0.7%, 1%, 5%, 10%, 15%, 20% or any value therebetween).

The following example is provided to illustrate, but not limit the scope of this disclosure.

Experimental Example

Applicant has shown that the compositions of the instant disclosure are substantially the same as a sugar solution or a simple syrup in terms of taste, viscosity and mouth feel qualities, and it has substantially the same properties as a simple syrup in terms of taste, viscosity and mouth feel when mixed into a liquid at the appropriate concentration.

The sweetener/fiber composition was also used in several different settings of 2-30 people to create several types of cocktails whereby fresh citrus is used, including whiskey sours and margaritas. Again, participants favorably compared the cocktails made with the sweetener/fiber blend for taste, and when informed of the calorie savings, showed a strong preference for the cocktails made with composition of the instant disclosure.

An example cocktail recipe follows: Dissolve 1.5 g of the sweetener/fiber composition into 8 ounces of water with a light stir. Crack a fresh egg white into your cocktail shaker, discarding the yolk. Add the fresh squeezed juice of one lemon and ½ lime, optionally tossing in the citrus shell. Pour in 2 ounces of the sweetener/fiber composition. Add 2.5 ounces quality bourbon or whiskey, such as Basil Hayden. Add ice to top. Shake vigorously for 2 minutes, strain and pour into a chilled cocktail glass. Top with a splash of cocktail bitters such as Angostura.

Equivalents

Unless otherwise defined, all technical and scientific terms used herein have the same meaning as commonly understood by one of ordinary skill in the art to which this invention belongs.

The inventions illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed.

Thus, it should be understood that although the present invention has been specifically disclosed by preferred embodiments and optional features, modification, improvement and variation of the inventions embodied therein herein disclosed may be resorted to by those skilled in the art, and that such modifications, improvements and variations are considered to be within the scope of this invention. The materials, methods, and examples provided here are representative of preferred embodiments, are exemplary, and are not intended as limitations on the scope of the invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

All publications, patent applications, patents, and other references mentioned herein are expressly incorporated by reference in their entirety, including all formulas and figures, to the same extent as if each were incorporated by reference individually. In case of conflict, the present specification, including definitions, will control.

Other embodiments are set forth within the following claims.

What is claimed is:

1. A sugar-free composition consisting essentially of, by weight of the total composition:
   0.5%-7.5% stevia leaf extract,
   0.01%-2.5% Monk fruit (Luo Han Guo) extract,
   0.03%-2% at least one natural or artificial flavor, and
   70%-97% dietary fiber,
   wherein the composition has an approximate viscosity of between about 2000 and about 5000 centipoise at 20° C., and
   wherein the composition has substantially the same mouth feel and texture as simple syrup.

2. The composition of claim 1, wherein the at least one flavor is a natural or artificial flavor selected from vanilla flavor, caramel flavor, bourbon flavor or molasses flavor.

3. The composition of claim 1, wherein the dietary fiber comprises a soluble dietary fiber.

4. The composition of claim 3, wherein the soluble dietary fiber is selected from tapioca fiber, maltodextrin, corn fiber, oat fiber, pea fiber, bean fiber, apple fiber, citrus fruit fiber, carrot fiber, potato fiber, galacto-oligosaccharides or psyllium fiber.

5. The composition of claim 1, wherein the viscosity of the composition is approximately identical to simple syrup.

6. An edible or potable composition, optionally a beverage, comprising the composition of claim 1.

7. A food product comprising the composition of claim 1.

8. A sugar-free sweetener composition consisting essentially of, by weight of the total composition:
   0.5%-7.5% of stevia leaf extract,
   0.01%-2.5% of Monk fruit (Luo Han Guo) extract,
   0.03%-2% of at least one natural or artificial flavor,
   0.01%-3% masking agent, and
   70%-97% dietary fiber.

9. The sweetener composition of claim 8, wherein the at least one flavor comprises vanilla flavor, caramel flavor, bourbon flavor and/or molasses flavor.

10. The sweetener composition of claim 8, wherein the composition is a liquid composition.

11. The sweetener composition of claim, 8 wherein the dietary fiber is a soluble dietary fiber.

12. The sweetener composition of claim 11, wherein the soluble dietary fiber is selected from tapioca fiber, maltodextrin, corn fiber, oat fiber, pea fiber, bean fiber, apple fiber, citrus fruit fiber, carrot fiber, potato fiber, galacto-oligosaccharides or psyllium fiber.

13. The sweetener composition of 8, wherein the composition is a solid composition.

14. A method of making a sweetener composition, comprising:
   admixing ingredients consisting essential of, by weight of the total composition:
   0.5%-7.5% stevia leaf extract,
   0.01%-2.5% Monk fruit (Luo Han Guo) extract,
   0.03%-2% at least one natural or artificial flavor, and
   70%-97% dietary fiber,
   wherein the composition has an approximate viscosity of between about 2000 and about 5000 centipoise at 20° C.

15. The method of claim 14, wherein the at least one flavor is a natural flavor selected from vanilla flavor, caramel flavor, bourbon flavor or molasses flavor.

16. The method of claim 14, wherein the dietary fiber comprises a soluble dietary fiber.

17. The method of claim 16, wherein the soluble dietary fiber is selected from tapioca fiber, maltodextrin, corn fiber, oat fiber, pea fiber, bean fiber, apple fiber, citrus fruit fiber, carrot fiber, potato fiber, galacto-oligosaccharides or psyllium fiber.

18. A method for sweetening a beverage or a food product comprising adding to the beverage or the food product the composition of claim 1.

19. The method of claim 18, wherein the composition is added at 0.1%-20% by weight of the total beverage or food product.

* * * * *